Patented Nov. 21, 1922.

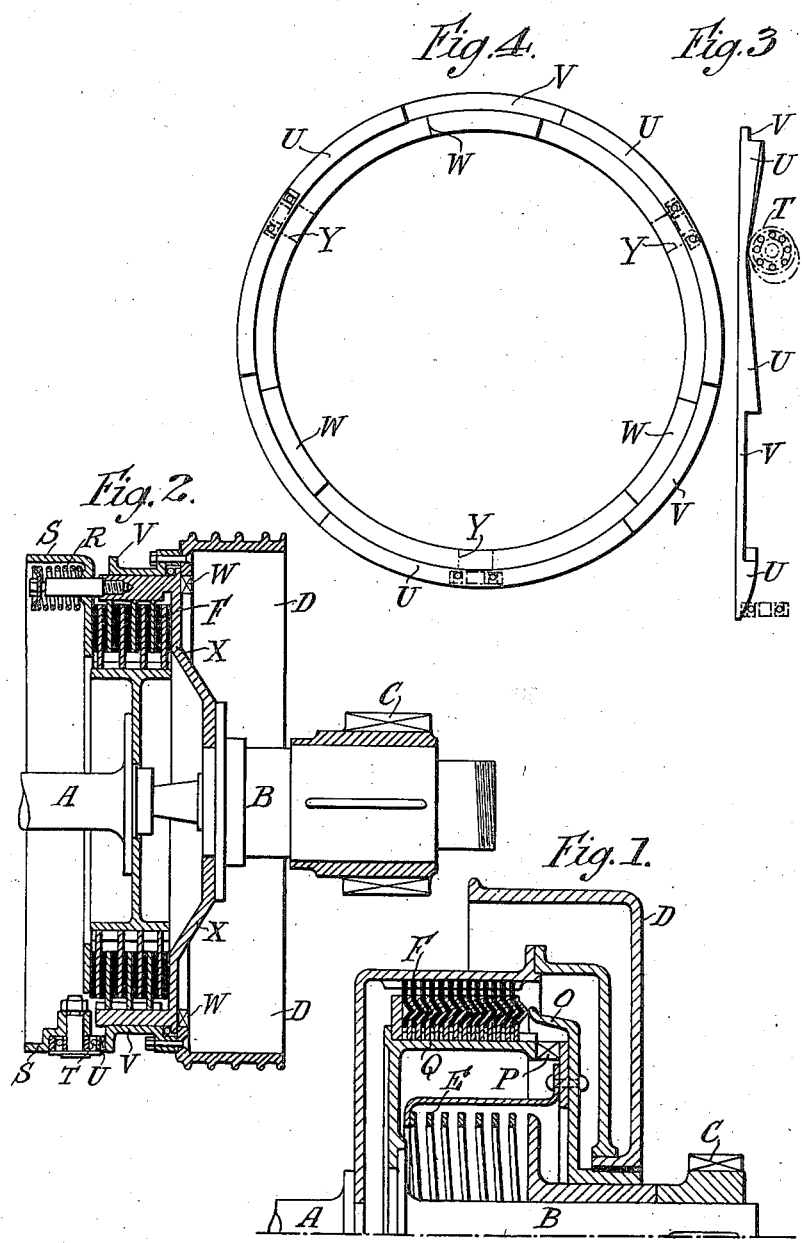

1,436,604

UNITED STATES PATENT OFFICE.

GEORGE JOHN RACKHAM, OF PUTNEY, LONDON, ENGLAND, ASSIGNOR TO ROADLESS TRACTION LIMITED, OF LONDON, ENGLAND.

MEANS FOR TRANSMITTING ROTARY MOTION ESPECIALLY SUITABLE FOR ENDLESS-TRACK VEHICLES.

Application filed March 19, 1921. Serial No. 453,833.

*To all whom it may concern:*

Be it known that I, GEORGE JOHN RACKHAM, a subject of the King of Great Britain, residing at 146 Upper Richmond Road, Putney, London, England, have invented new and useful Improved Means for Transmitting Rotary Motion Especially Suitable for Endless-Track Vehicles, of which the following is a specification.

The object of my invention is to provide means for transmitting rotary motion in which the motion of the driven part may assist in the act of disconnecting the driven part from the driving part.

A further object of my invention is to allow the clutch to provide variable power so that variable speeds can be obtained without heating or slipping.

According to this invention I provide on a driven shaft a brake drum which is capable of a small movement of rotation about the shaft, a clutch between the driving and driven shaft, and means operated by the brake drum to declutch the clutch; such means may be cam surfaces or grooves arranged between the brake drum and one member of the clutch whereby the small rotary movement of the brake drum is converted into movement along the shaft of the brake drum or of one member of the clutch whereby the clutch is put out of operation. If the brake be further retarded the brake drum comes against a stop on the driven shaft and is locked to the driven shaft through the cams and therefore the driven shaft is retarded by the brake. Preferably a spring means is provided which will return the clutch to operative position whenever the brake drum is released.

Alternatively the cams may cause the contraction of a spring thereby relieving the spring load on the plates of the clutch. In such a case a cam on the brake drum may move a plate which carries springs causing the disengagement of the plates of the clutch. The rotary movement of the brake drum may be limited by lugs on the brake drum which engage corresponding lugs on the driven member of the clutch.

The cams may be inclined in both directions so that the clutch may be operated both for forward and backward running of the vehicle.

The drawings illustrate examples of mechanism made in accordance with this invention.

Figure 1 is a section of one half of a clutch arrangement.

Figure 2 is a section of an arrangement in which the cam surfaces cause the contraction of a spring to relieve the load on the plates of a clutch.

Figure 3 shows the cam surfaces employed in the arrangement shown in Figure 2.

Figure 4 also shows the cam surfaces and also stops for transmitting power to the brake drum.

In all the figures A is a driving shaft, B a driven shaft, C the final drive wheel and D the brake drum mounted on the driven shaft B.

In Figure 1 a spring E holds a flanged disk O in contact with the outside plate of the clutch F, so holding the clutch in action. When the brake drum D is retarded cam surfaces P between the ring O and one member Q of the clutch cause the brake drum and ring O to move against the action of the spring E, thereby declutching the clutch F.

In Figures 2, 3 and 4, the clutch F is maintained in action by springs R. A plate S carries the springs R and ball races T which engage with cam surfaces U on a ring V fixed to the brake drum D, and on the ring V are lugs W which engage with corresponding lugs Y on the driven member X of the clutch, whereby the brake drum moves with the driven shaft B. The cam surfaces U are inclined in both directions so that the clutch may be operated for both forward and backward running of the vehicle.

When the invention is applied to endless track vehicles, a brake drum is mounted on the shaft of the final drive wheel C driving each track and the vehicle can be steered by putting on the brake slightly. This will tend to disconnect one of the tracks from the driving shaft and the motion of this track will assist in the act of disconnection and power will not be transmitted to the track as long as the brake is already slightly on. By putting the brake hard on the track can thus be definitely braked.

What I claim is:

1. The combination of a driving shaft, a driven shaft, a brake drum mounted on the driven shaft, and capable of a small amount of rotation about it, a clutch between the driving and driven shafts and which functions which ever way the driving shaft turns, spring means for holding the clutch in action, a ring member turning with the brake drum, cam surfaces on said ring member and cooperative cam surfaces on one clutch member whereby retardation of the brake drum compresses the spring means and declutches the clutch, said spring means returning the clutch to operative position whenever the brake drum is released.

2. The combination of a driving shaft, a driven shaft, a brake drum mounted on the driven shaft, and capable of a small amount of rotation about it, a friction clutch between the driving and driven shafts and which functions whichever way the driving shaft turns, spring means for holding the clutch in action, a ring member turning with the brake drum, and cooperating cam surfaces whereby retardation of the brake drum compresses the spring means and releases the frictional engagement of the clutch surfaces, said spring means returning the clutch to operative position whenever the brake drum is released.

3. The combination of a driving shaft, a driven shaft, a brake drum mounted on the driven shaft, and capable of a small amount of rotation about it, a clutch between the driving and the driven shafts and which functions whichever way the driving shaft turns, spring means for holding the clutch in action, a ring member connected to the brake drum, cam surfaces on said ring member, and antifriction members carried by one of the clutch elements and engaging said cam surfaces whereby retardation of the brake drum declutches the clutch.

In testimony that I claim the foregoing as my invention I have signed my name this second day of March, 1921.

GEORGE JOHN RACKHAM.